United States Patent [19]

Hirt

[11] 4,174,771

[45] Nov. 20, 1979

[54] FRICTION CLUTCH

[75] Inventor: Manfred Hirt, Munich, Fed. Rep. of Germany

[73] Assignee: Carl Hurth Maschinen- und Zahnradfabrik, Munich, Fed. Rep. of Germany

[21] Appl. No.: 823,424

[22] Filed: Aug. 10, 1977

[30] Foreign Application Priority Data

Aug. 14, 1976 [DE] Fed. Rep. of Germany ....... 2636741

[51] Int. Cl.² ..................... F16D 35/00; F16D 43/25; F16D 43/14

[52] U.S. Cl. ................ 192/58 B; 192/82 T; 192/105 A

[58] Field of Search .............. 192/58 A, 58 B, 58 C, 192/82 T, 105 A

[56] References Cited

U.S. PATENT DOCUMENTS

| Re. 14,933 | 8/1920 | Lake | 192/58 A |
|---|---|---|---|
| 1,931,209 | 10/1933 | Rudqvist | 192/58 A |
| 2,901,074 | 8/1959 | Badin | 192/105 A X |
| 3,055,474 | 9/1962 | Ferris et al. | 192/82 T |
| 3,228,500 | 1/1966 | Hollander | 192/58 A |

FOREIGN PATENT DOCUMENTS

| 623813 | 1/1936 | Fed. Rep. of Germany | 192/58 A |
| 457132 | 11/1936 | United Kingdom | 192/58 A |

*Primary Examiner*—Allan D. Herrmann
*Attorney, Agent, or Firm*—Blanchard, Flynn, Thiel, Boutell & Tanis

[57] ABSTRACT

A friction clutch having a pair of axially spaced first friction members connected to a first clutch half and at least one second friction member connected to the other clutch half. Both of the clutch halves define a housing for containing a liquid which is free to flow between the first friction members as well as between the second friction member and the first friction members when the second friction member is interposed between the first friction members. The second friction member is supported for movement into and out of axial alignment with the first friction members so that the liquid contained between the first and second friction members will function as the torque transmitting medium to effect a drive from the first clutch half to the second clutch half and vice versa.

16 Claims, 7 Drawing Figures

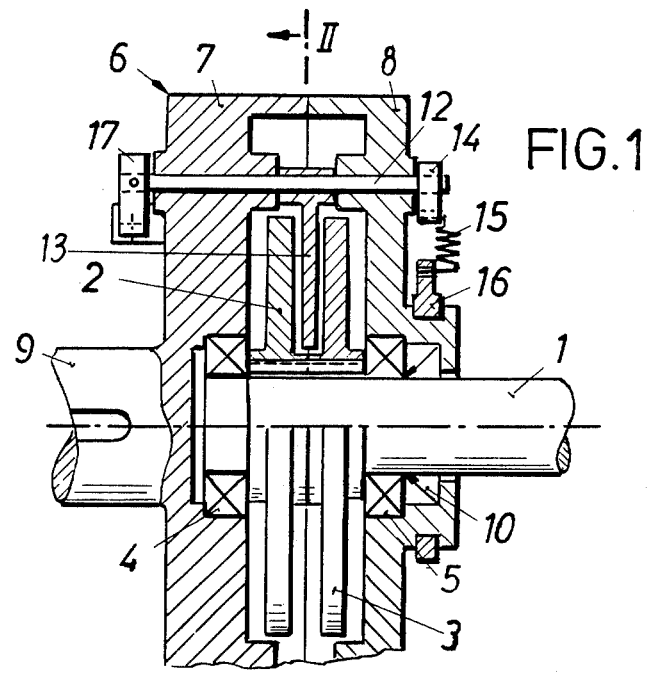
FIG.1
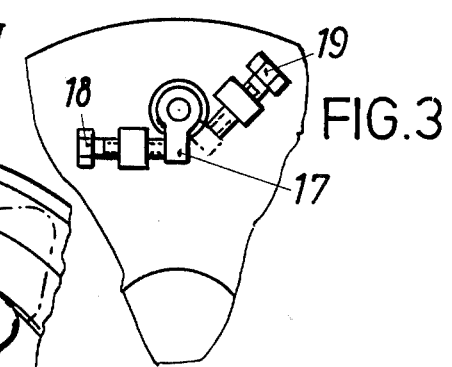
FIG.2
FIG.3
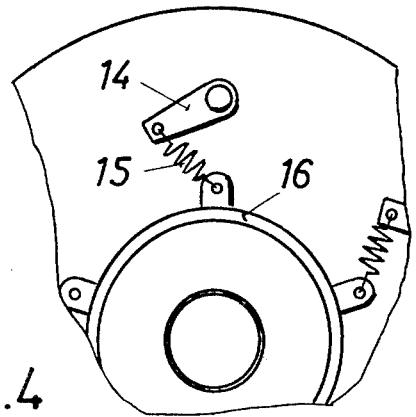
FIG.4

4,174,771

FRICTION CLUTCH

FIELD OF THE INVENTION

The invention relates to a friction clutch having at least one first friction member connected to a first clutch half and at least one second friction member connected to the other clutch half, a liquid, wherein the torque is transmitted by the liquid from the first friction member onto the second friction member.

BACKGROUND OF THE INVENTION

Friction clutches, in particular disk clutches, are known wherein the transmitting torque can be selected by more or less compressing the friction members, in particular the dislike lamellae, and by permitting them to slip more or less. The transmitted or transmittable torque can thereby not be preadjusted, also great friction losses are produced.

In addition, clamping member freewheels are known wherein the torque is transmitted only in one direction of rotation. These freewheel clutches are subject to a relatively high wear; furthermore the torque is not adjustably limited.

Therefore the basic purpose of the invention is to provide a clutch wherein substantially a wear-free limitation and preadjustability of the torque is possible.

The object and purposes of the invention are met by providing a friction clutch which has a pair of axially spaced first friction members and a second friction member interposed between the first friction members. The first friction members are connected to a first clutch half and the second friction member is connected to the other clutch half. A liquid is contained within a housing defining the two clutch halves. The second friction members are supported for movement between the first friction members to an axially aligned position. The liquid contained between the second friction member and the first friction members defines the torque transmitting medium for effecting a drive between the first and second friction members.

The invention permits a limiting of the torque both in magnitude and also according to the direction of rotation.

The torque of the clutch is inventively regulated by selectively moving the second friction members between the first friction members. The depth of penetration therebetween can be limited by a stop to the lowest point of the penetration or by resilient devices. In these embodiments, the clutch acts inventively as a freewheel.

The clutch of the invention can also be developed wherein the second friction members are secured in a selected position so that a chosen torque can be transmitted in both directions of rotation.

The clutch acts inventively as a centrifugal clutch when the second friction members are supported outside of their center of gravity and have additional centrifugal weights.

Further advantages and characteristics of the invention can be taken from the following description.

BRIEF DESCRIPTION OF THE DRAWING

The invention is discussed with reference to an exemplary embodiment which is shown in FIGS. 1 to 4.

FIG. 1 schematically illustrates a cross-section of a friction clutch according to the invention;

FIG. 2 is a partial cross-sectional view taken along the line II—II of FIG. 1;

FIG. 3 illustrates inventive stop screws;

FIG. 4 illustrates a further detail of the invention;

DETAILED DESCRIPTION

Figure 5:
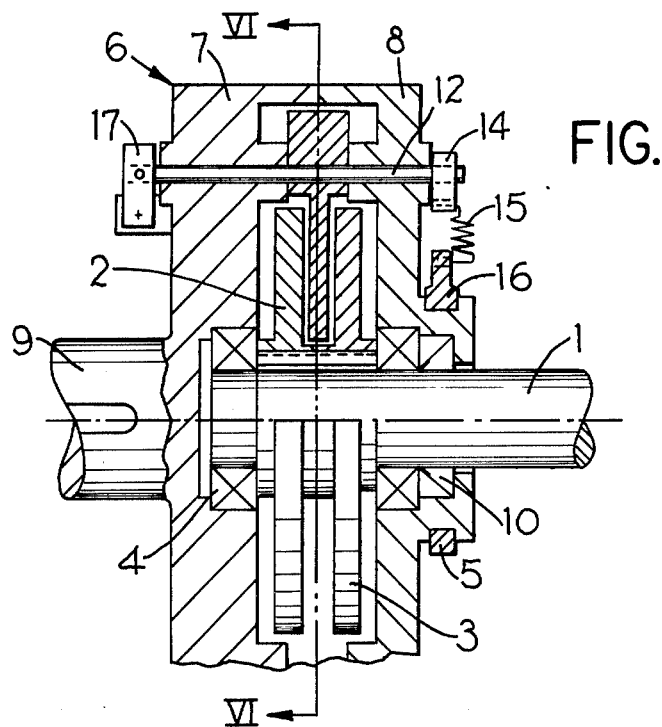
FIG. 5 is a fragmentary sectional view of a modified embodiment wherein the segments have additional weights.

The one (first) half of the clutch is defined by a first shaft 1 on which is fixedly arranged two axially spaced disks 2, 3 functioning as first friction members. The first shaft 1 is rotatably supported in bearings 4, 5 mounted in a second clutch half 6 which consists substantially of two mutually facing cup-shaped housings 7, 8 which are connected together as by screws with one of the two cup-shaped housings being united or fixedly connected to a second shaft 9 while the other cup-shaped housing 8 is sealed off against the first shaft 1 by a shaft packing ring 10. The screws which hold the two cup-shaped housings together are identified by the reference numeral 11 (FIG. 2). The housing 7, 8 is filled with a liquid, for example oil, preferably a viscous fluid, for example silicon. The filling device is not shown.

The torque must be transmitted from the one clutch half to the other one. For this purpose a plurality of segments 13 functioning as second friction members are rotatably supported in the cup-shaped housings of the second clutch half 6 on concentrically arranged shafts 12. Each of the segments 13 are pivotal between the axially spaced disks 2, 3. A small axial spacing exists between the surfaces on the disks and the surfaces on each of the segments. These surfaces are contained in planes which are perpendicular to the axis of rotation of the shafts 1 and 9. In place of only two disks and one series of segments lying therebetween, it is also possible to arrange several structures axially side-by-side. The shafts 12 extend axially outwardly from both sides of the cup-shaped housings. Levers 14 are fixedly mounted on one end of each of the shafts 12. A spring 15 is secured to each of the levers 14 at one end thereof while the other end is secured to a ring 16. The ring 16 is rotatably supported and axially fixedly secured to one of the cup-shaped housings. By rotating the ring 16, each of the springs 15 can be tensioned more or less. A stop cam 17 is fixedly secured to the other end of the shaft 12, which end projects from the respective cup-shaped housing. On both sides in the range of rotation of the stop cam 17 there are supported adjustable stop screws 18, 19 movable relative to the cup-shaped housing. The stop cam 17 is urged into engagement with one of these stop screws by the springs 15. The other stop screw limits the rotation of the segments 13 against the force of the springs 15. The stop screws 18, 19 can also be adjusted to a position without clearance against the stop cams 17 so that the segments cannot rotate, namely at a selected position between the disks.

OPERATION

The operation of the clutch will be readily understood by those skilled in the art. However, a brief explanation of the operation will be given for convenience.

A drive is rotatingly applied to the input shaft 1 and causes a rotation of the disks 2 and 3. Since the segments 13 are initially biassed to a position axially aligned with and between the disks 2 and 3, the thin layer of liquid between the segments 13 and the disks 2 and 3 effects a transmission of torque, caused by a shearing of the liquid, to the output shaft 9. As the output shaft 9 gains in speed, the segments are moved radially out of the spacing between the disks 2 and 3 so that the transmitted torque diminishes with increased speed. The radial movement of the segments is controlled by the stop screws 18 and 19.

If the stop cams 17 and thus the segments 13 are secured with a selected depth of penetration between the disks, then the transmittable torque can be selected for the two directions of rotation.

If the stop screws are adjusted so that a clearance exists between the stop cams 17 and the screws 18 and 19 and without any springs or at least are ineffective, then the clutch operates as freewheel.

Figure 6:
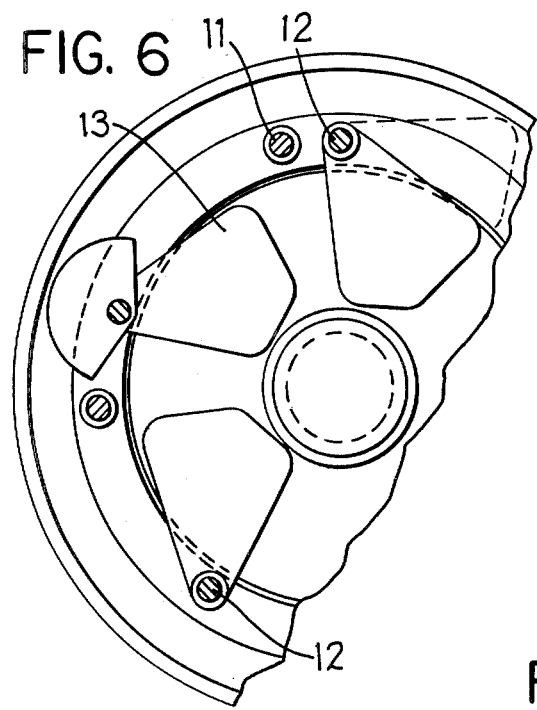
FIG. 6 is a sectional view taken along the line VI—VI of FIG. 5.

If the segments 13 are suspended outside of their center of gravity and a spring force is adjusted, then the clutch acts as a centrifugal clutch. The segments 13 can be equipped with additional weights 13A for this purpose as shown in FIGS. 5 and 6.

Figure 7:
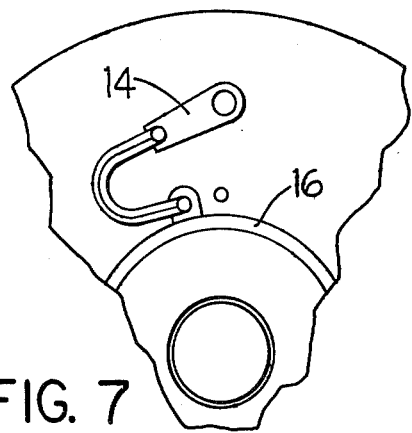
FIG. 7 is a fragmentary view of a further embodiment.

In place of the shown springs, it is also possible to build in bimetallic elements 15A (FIG. 7) or the like. In this arrangement, the torque of the coupling depends on the existing temperature. The bimetallic element effects a movement of the legs 15B and 15C in response to temperature changes to cause the movement of the stop cam 17 and connected shaft as aforesaid.

The torque can also be selected or be changed by using liquids of various viscosity or by filling the housing of the clutch differently.

Also combinations of the shown possibilities can serve certain purposes.

The advantage of the invention is that the torque transmission takes place without metal to metal contact, namely by the shearing force of the active liquid which is provided between the friction members.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a friction clutch having at least one rotatable first friction member connected to a first clutch half and at least one rotatable second friction member connected to a second clutch half, a liquid, wherein the torque is transmitted by said liquid from said first friction member onto said second friction member, the improvement comprising wherein said first friction member is connected rotationally fixed to said first clutch half and has a first surface thereon, wherein said second friction member includes at least one segment having a second surface thereon parallel to said first surface, said first and second surfaces lying in axially spaced planes perpendicular to the axis of rotation of said first and second friction members, said segment being movably supported in the torque-transmitting vicinity of said first friction member on said first clutch half and includes stop means for limiting movement of said segment in a direction toward a first position wherein said first and second surfaces are opposed, the spacing between said first and second surfaces being such as to effect a shearing of said liquid to effect a drive between said segment and said first friction member.

2. The improved friction clutch according to claim 1, wherein said stop means includes adjustable limit means for controlling the location of said first position.

3. The improved friction clutch according to claim 1, wherein the filling of the liquid can be controlled.

4. The improved friction clutch according to claim 1, wherein said stop means includes adjustable limit means for controlling the relative opposed relation between said first and second surfaces.

5. The improved friction clutch according to claim 1, wherein said segment is rotatably supported.

6. The improved friction clutch according to claim 1, wherein said second friction member includes a plurality of segments each having a second surface thereon.

7. The improved friction clutch according to claim 6, wherein said segments are biassed to said first position by a resilient member.

8. The improved friction clutch according to claim 6, wherein the said stop means includes adjustable limit means for limiting the movement of said segments so that said first and second surfaces are unopposed at a second position.

9. The improved friction clutch according to claim 6, wherein said segments are movably supported outside of their center of gravity.

10. The improved friction clutch according to claim 9, wherein said segments have additional centrifugal weights.

11. The improved friction clutch according to claim 6, wherein said stop means includes adjustable limit means for controlling the amount of opposed relation between said first and second surfaces.

12. The improved friction clutch according to claim 11, wherein the position of said segments relative to said first surface is controlled by a temperature-dependent element.

13. The improved friction clutch according to claim 12, wherein said temperature-dependent element is a bimetallic element.

14. The improved friction clutch according to claim 6, wherein two axially spaced first friction members are provided and are rotatably supported in a housing structure defined by said second clutch half and being adapted to hold said liquid therein and between said first friction members;
   wherein said segments are pivotally supported for movement into and out of a position between said first friction members, the spacing between said segments and said first friction members being such as to effect a shearing of the liquid to effect a drive therebetween.

15. The improved friction clutch according to claim 14, wherein said liquid is a viscous liquid.

16. The improved friction clutch according to claim 12, wherein said segments are biassed by springs toward said first position between said first friction members and wherein said stop means includes means for adjusting the initial tension in said springs.

* * * * *

UNITED STATES PATENT AND TRADEMARK OFFICE
CERTIFICATE OF CORRECTION

PATENT NO. : 4 174 771
DATED : November 20, 1979
INVENTOR(S) : Manfred Hirt

It is certified that error appears in the above–identified patent and that said Letters Patent are hereby corrected as shown below:

Column 4, line 61; change "12" to ---14---.

Signed and Sealed this

Eighteenth Day of March 1980

[SEAL]

Attest:

SIDNEY A. DIAMOND

Attesting Officer          Commissioner of Patents and Trademarks